United States Patent
Aoki et al.

(10) Patent No.: US 11,749,297 B2
(45) Date of Patent: Sep. 5, 2023

(54) AUDIO QUALITY ESTIMATION APPARATUS, AUDIO QUALITY ESTIMATION METHOD AND PROGRAM

(71) Applicant: Nippon Telegraph and Telephone Corporation, Tokyo (JP)

(72) Inventors: Hitoshi Aoki, Musashino (JP); Atsuko Kurashima, Musashino (JP); Ginga Kawaguchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/798,669

(22) PCT Filed: Feb. 13, 2020

(86) PCT No.: PCT/JP2020/005492
§ 371 (c)(1),
(2) Date: Aug. 10, 2022

(87) PCT Pub. No.: WO2021/161440
PCT Pub. Date: Aug. 19, 2021

(65) Prior Publication Data
US 2023/0079632 A1    Mar. 16, 2023

(51) Int. Cl.
*G10L 25/60* (2013.01)
*G10L 19/005* (2013.01)
(Continued)

(52) U.S. Cl.
CPC ............ *G10L 25/60* (2013.01); *G10L 19/005* (2013.01); *G10L 25/69* (2013.01); *H04M 3/2236* (2013.01)

(58) Field of Classification Search
CPC ....... G10L 25/72; G10L 25/60; G10L 19/005; G10L 25/69; H04M 3/2236
See application file for complete search history.

(56) References Cited

U.S. PATENT DOCUMENTS

| 9,031,838 B1* | 5/2015 | Nash ................... H04M 3/2227 704/226 |
| 2009/0099843 A1* | 4/2009 | Barriac ................... G10L 25/69 704/E11.002 |

(Continued)

FOREIGN PATENT DOCUMENTS

WO    WO-2011018428 A1 *    2/2011    ............. G10L 25/69

OTHER PUBLICATIONS

[No Author Listed], "The E-model: a computational model for use in transmission planning," Recommendation ITU-T G.107, Jun. 2015, 30 pages.

(Continued)

*Primary Examiner* — Douglas Godbold
(74) *Attorney, Agent, or Firm* — Fish & Richardson P.C.

(57) ABSTRACT

A voice quality estimation apparatus includes: a packet sequence creation unit configured to create a first sequence by applying a first characteristic indicating that quality degradation caused by packet loss is perceived by a user all at once, to a sequence consisting of elements each indicating whether or not a packet of a voice call has been lost; a smoothing unit configured to create a second sequence from the first sequence; a degradation amount emphasis unit configured to create a third sequence from the second sequence; a packet loss tolerance characteristics reflection unit configured to create a fourth sequence from the third sequence; a degradation amount calculation unit configured to calculate a degradation amount from the fourth sequence; and a listening quality estimation unit configured to estimate voice quality that is to be experienced by the user, from the degradation amount.

18 Claims, 8 Drawing Sheets

(51) Int. Cl.
*G10L 25/69* (2013.01)
*H04M 3/22* (2006.01)

(56) References Cited

U.S. PATENT DOCUMENTS

| | | | | |
|---|---|---|---|---|
| 2010/0106489 | A1* | 4/2010 | Berends | G10L 25/69 |
| | | | | 704/207 |
| 2011/0075852 | A1* | 3/2011 | Egi | G10L 25/69 |
| | | | | 381/56 |
| 2011/0218803 | A1* | 9/2011 | Ketabdar | G10L 25/48 |
| | | | | 704/E15.001 |
| 2012/0148057 | A1* | 6/2012 | Berends | G10L 25/69 |
| | | | | 381/56 |
| 2014/0358526 | A1* | 12/2014 | Abdelal | H04L 65/80 |
| | | | | 704/202 |
| 2019/0108851 | A1* | 4/2019 | Soulodre | G10L 19/26 |
| 2019/0172479 | A1* | 6/2019 | Xiao | G06F 17/18 |
| 2020/0286504 | A1* | 9/2020 | Seetharaman | G10L 21/0232 |
| 2022/0311867 | A1* | 9/2022 | Zhao | H04M 3/2254 |
| 2022/0399945 | A1* | 12/2022 | Frenkel | G10L 17/02 |
| 2023/0076338 | A1* | 3/2023 | Kurihara | H04M 9/00 |
| 2023/0083706 | A1* | 3/2023 | Kakemura | G10L 25/60 |

OTHER PUBLICATIONS

Aoki et al., "Subjective Quality Evaluation of Bursty Packet Loss in IP-Telephony Services," IEICE Technical Report, 2019, 119(7):13-18, 13 pages (with English Translation).

Clark, "Modeling the Effects of Burst Packet Loss and Recency on Subjective Voice Quality," IP Telephony Workshop 2001, Apr. 2001, 6 pages.

Jelassi et al., "A Comparison Study of Automatic Speech Quality Assessors Sensitive of Packet Loss Burstiness," 2011 IEEE Consumer Communications and Networking Conference (CCNC), Jan. 9, 2011, 6 pages.

Zhang et al., "Packet Loss Burstiness and Enhancement to the E-Model," Proceedings of the Sixth International Conference on Software Engineering, Artificial Intelligence, Networking and Parallel / Distributed Computing and First ACIS International Workshop on Self-Assembling Wireless Networks (SNPD / SAWN'05), May 23, 2005, 6 pages.

* cited by examiner

| PARAMETER<br>COMBINATION | M | α | β | γ | a | b | c |
|---|---|---|---|---|---|---|---|
| (CODEC 1, PLC1) | 20 | 1.5 | 1 | 20 | 1 | 20 | 10 |
| (CODEC 1, PLC2) | ... | ... | ... | ... | ... | ... | ... |
| ... | ... | ... | ... | ... | ... | ... | ... |

AUDIO QUALITY ESTIMATION APPARATUS, AUDIO QUALITY ESTIMATION METHOD AND PROGRAM

CROSS-REFERENCE TO RELATED APPLICATIONS

This application is a National Stage application under 35 U.S.C. § 371 of International Application No. PCT/JP2020/005492, having an International Filing Date of Feb. 13, 2020. The disclosure of the prior application is considered part of the disclosure of this application, and is incorporated by reference in its entirety into this application.

TECHNICAL FIELD

The present invention relates to a voice quality estimation device, a voice quality estimation method, and a program.

BACKGROUND ART

E-model for estimating the voice quality of a voice call using a network and terminal performance parameters has been known as a conventional technology (Non Patent Literature 1). The E-model makes it possible to evaluate the influence of packet losses on voice quality in a packet network, by using a packet loss rate and BurstR, which are network performance indicators.

Here, according to an evaluation criterion regarding the burstiness of packet losses in the case of estimating voice quality with the E-model, it is proposed that, when the loss of a certain packet is found, the weight on a loss with respect to the pattern of the packet sequence that is arranged a predetermined length backward from the packet immediately preceding the lost packet is increased as the distance to the aforementioned lost packet decreases (NPL 2). In addition, a method of estimating voice quality by defining a gap state with high loss randomness and a burst state with high burstiness with respect to a loss pattern of packets in a call is also known (NPL 3).

Also, there is a comparison between the voice quality estimation that employs the E-model described in NPL 1, the voice quality estimation that employs E-model to which the evaluation criterion described in NPL 2 is applied, and the voice quality estimation described in NPL 3 (NPL 4). Also, it is known that, regarding voice quality over a certain period, in the case of a quality degradation that occurs suddenly, the same level of voice quality is perceived by the user even if the burstiness in the loss occurrence period is different (NPL 5).

CITATION LIST

Non Patent Literature

[NPL 1] ITU-T G.107 The E-model: a computational model for use in transmission planning
[NPL 2] H. Zhang, L. Xie, J. Byun, P. Flynn, C. Shim, "Packet Loss Burstiness and Enhancement to the E-Model"
[NPL 3] D. Clark, "Modeling the Effects of Burst Packet Loss and Recency on Subjective Voice"
[NPL 4] S. Jelassi, G. Rubino, "A Comparison Study of Automatic Speech Quality Assessors Sensitive of Packet Loss Burstiness"
[NPL 5] "Subjective quality evaluation of bursty packet loss in IP telephony services", IEICE Technical Report CQ2019-3 (2019.4)

SUMMARY OF THE INVENTION

Technical Problem

According to NPL 1, the average length of an observed burst loss is used as BurstR. Therefore, if distribution information regarding the burst loss is missing and the average length of the burst loss is the same over a certain period, the same BurstR is calculated. Therefore, according to the voice quality estimation that employs the E-model described in NPL 1, even if the burst loss distribution is different, the same quality is calculated if the average length is the same, and the characteristics of voice quality described in NPL 5 cannot be captured.

Also, according to the voice quality estimation that employs the E-model to which the evaluation criterion described in NPL 2 is applied, the amount of degradation in voice quality monotonically increases as the period in which packets are continuously lost increases, due to the evaluation criterion. Therefore, even if packets are not necessarily continuously lost, it is not possible to accurately grasp the influence of packet losses that suddenly occur all at once in a certain range, on voice quality.

Furthermore, NPL 4 indicates that the performance of voice quality estimation described in NPL 3 is lower than the performance of the voice quality estimation that employs the E-model described in NPL 1 and the performance of voice quality estimation that employs the E-model to which the evaluation criterion described in NPL 2 is applied. Therefore, even the voice quality estimation described in NPL 3 does not accurately capture the burstiness of packet losses.

As described above, with conventional voice quality estimation, it is not possible to accurately capture sudden quality degradation (that is to say, quality degradation that is caused by packet losses that occur in a burst-like manner) other than quality degradation that is caused by constant packet loss (that is to say, quality degradation that is caused by packet losses that occur in a random manner).

An embodiment of the present invention is made in view of the above issues, and an objective thereof is to precisely estimate the voice quality of a voice call that is made via a communication network.

Means for Solving the Problem

To achieve the above-described objective, a voice quality estimation apparatus according to one embodiment includes: first sequence creation means for creating a first sequence by applying a first characteristic indicating that quality degradation caused by packet loss is perceived by a user all at once, to a sequence consisting of elements each indicating whether or not a packet of a voice call has been lost; second sequence creation means for creating a second sequence by applying a second characteristic indicating that the larger the quality degradation is, the more likely the user is to perceive the quality degradation, to the first sequence created by the first sequence creation means; third sequence creation means for creating a third sequence by applying a third characteristic indicating that packet loss concealment alleviates the quality degradation to be perceived, to the second sequence created by the second sequence creation means; calculation means for calculating a degradation amount per unit time from the third sequence created by the third sequence creation means; and estimation means for estimating voice quality that is to be experienced by the user, from the degradation amount calculated by the calculation means, using a mapping function that indicates a relationship between the degradation amount regarding the voice quality and a voice quality evaluation value that is based on the user's subjectivity.

Effects of the Invention

It is possible to precisely estimate voice quality of a voice call that is made via a communication network.

BRIEF DESCRIPTION OF DRAWINGS

FIG. 4 is a diagram showing examples of parameters that are stored in a parameter DB.

DESCRIPTION OF EMBODIMENTS

Hereinafter, embodiments of the present invention will be described. The following embodiments describe a voice quality estimation system 1 that can precisely estimate voice quality (more accurately, the voice quality experienced by the user) in voice calls that are made via a communication network.

First Embodiment

Figure 1:
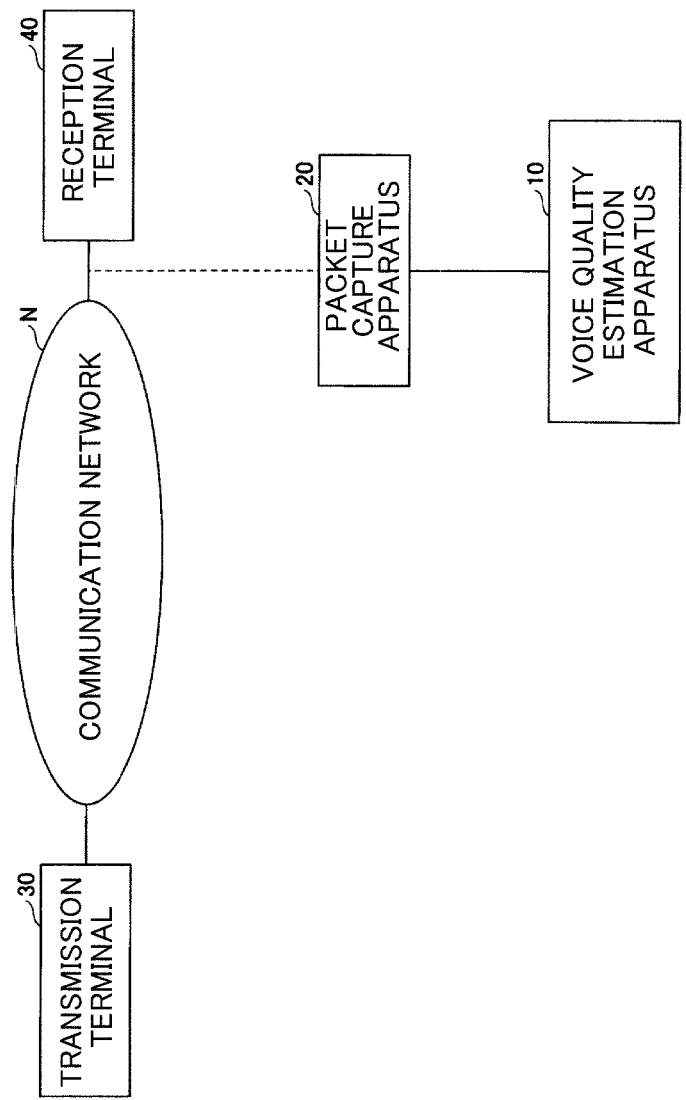
FIG. 1 is a diagram showing an example of an overall configuration of a voice quality estimation system according to a first embodiment.

First, a first embodiment will be described.
<Overall Configuration of Voice Quality Estimation System 1>
The following describes an overall configuration of a voice quality estimation system 1 according to the first embodiment with reference to FIG. 1. FIG. 1 is a diagram showing an example of an overall configuration of the voice quality estimation system 1 according to the first embodiment.

As shown in FIG. 1, the voice quality estimation system 1 according to the first embodiment includes a voice quality estimation apparatus 10, a packet capture apparatus 20, a transmission terminal 30, and a reception terminal 40.

The transmission terminal 30 is a terminal that transmits voice call packets (hereinafter may simply referred to as "packets") via a communication network N. The reception terminal 40 is a terminal that receives packets via the communication network N. Any terminals, apparatuses, or devices that can transmit and receive voice communication packets may be used as the transmission terminal 30 and the reception terminal 40. For example, PCs (personal computers), smartphones, tablet terminals, wearable devices, IoT (Internet of Things) devices, gaming devices, or the likes in which an application program for making a voice call is installed may be used as the transmission terminal 30 and the reception terminal 40. Note that the communication network N is, for example, any network such as the Internet.

The packet capture apparatus 20 is an apparatus that captures packets that have been transmitted from the transmission terminal 30 to the reception terminal 40. Hereinafter, the packets captured by the packet capture apparatus 20 are also referred to as "captured packets". Any terminal, apparatus, or device that can capture packets may be used as the packet capture apparatus 20. For example, a PC, a router, or the like in which an application program for capturing packets is installed may be used as the packet capture apparatus 20.

The voice quality estimation apparatus 10 is an apparatus that estimates the voice quality experienced by the user of the voice call service (that is to say, the user of the reception terminal 40), using the captured packets. Here, when quantifying non-constant quality degradation (that is to say, quality degradation that is caused by packet losses that occur in a burst-like manner), the voice quality estimation apparatus 10 can precisely estimate the voice quality experienced (perceived) by the user, by reflecting the following three characteristics (a) to (c).

(a) A characteristic that quality degradation that is caused by packet loss is perceived by the user all at once
(b) A characteristic that the larger the quality degradation is, the more likely the user is to perceive the quality degradation
(c) A characteristic that packet loss concealment (PLC) alleviates the quality degradation to be perceived Note that the above features (a) to (c) are useful not only when quantifying quality degradation that is caused by packet losses that occur in a burst-like manner (hereinafter also referred to as "burst losses"), but also when quantifying quality degradation that is caused by conventional packet losses that occur in a random manner (hereinafter also referred to as "random losses"). Therefore, by reflecting the above characteristics (a) to (c), it is possible to accurately quantify voice quality degradation that is caused by packet losses (packet losses that can be burst losses or random losses) in a voice call service.

Figure 2:
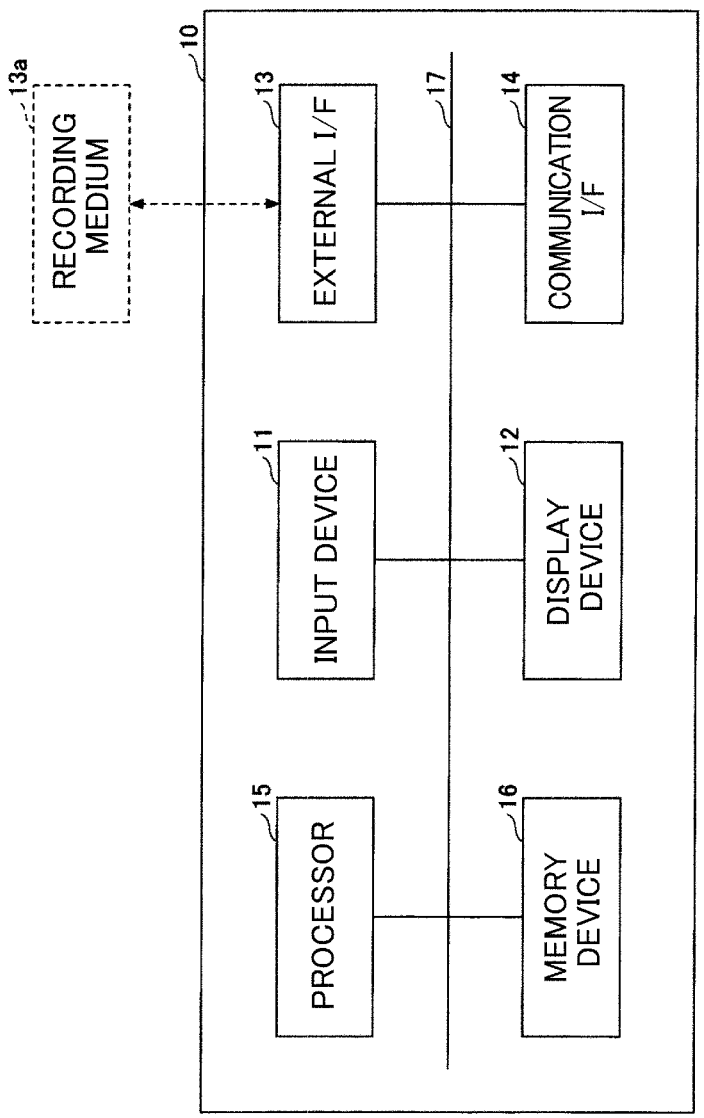
FIG. 2 is a diagram showing an example of a hardware configuration of a voice quality estimation apparatus according to the first embodiment.

Note that the configuration of the voice quality estimation system 1 shown in FIG. 1 is an example, and another configuration may be employed. For example, the packet capture apparatus 20 may be integrated with the reception terminal 40, or integrated with the voice quality estimation apparatus 10. That is to say, the reception terminal 40 may have the function of capturing packets, or the voice quality estimation apparatus 10 may have the function of capturing packets.
<Hardware Configuration of Voice Quality Estimation Apparatus 10>
Next, a hardware configuration of the voice quality estimation apparatus 10 according to the first embodiment will be described with reference to FIG. 2. FIG. 2 is a diagram showing an example of a hardware configuration of the voice quality estimation apparatus 10 according to the first embodiment.

As shown in FIG. 2, the voice quality estimation apparatus 10 according to the first embodiment is a general computer or computer system, and includes an input device 11, a display device 12, an external I/F 13, a communication I/F 14, a processor 15, and a memory device 16. These pieces of hardware are connected via a bus 17 so as to be able to communicate with each other.

The input device 11 is, for example, a keyboard, a mouse, a touch panel, or the like. The display device 12 is, for example, a display or the like. It is possible that at least either the input device 11 or the display device 12 is not included in the voice quality estimation apparatus 10.

The external I/F 13 is an interface with an external device. Examples of the external device include a recording medium 13a and so on. The voice quality estimation apparatus 10 can read and write data from and to the recording medium 13a via the external I/F 13. Note that examples of the recording medium 13a include a CD (Compact Disc), a DVD (Digital Versatile Disc), an SD memory card (Secure Digital memory card), a USB (Universal Serial Bus) memory card, and so on.

The communication I/F 14 is an interface with which the voice quality estimation apparatus 10 performs data communication with another device (for example, the packet capture apparatus 20 or the like). Examples of the processor 15 includes various kinds of arithmetic units such as a CPU (Central Processing Unit) and a GPU (Graphics Processing Unit). Examples of the memory device 16 include various kinds of storage devices such as an HDD (Hard Disk Drive, an SSD (Solid State Drive), a RAM (Random Access Memory), a ROM (Read Only Memory), a flash memory, and so on.

With the hardware configuration shown in FIG. 2, the voice quality estimation apparatus 10 according to the first embodiment can realize voice quality estimation processing, which will be described below. Note that the hardware configuration shown in FIG. 2 is an example, and the voice quality estimation apparatus 10 may have another hardware configuration. For example, the voice quality estimation apparatus 10 may include a plurality of processors 15 or a plurality of memory devices 16.

<Functional Configuration of Voice Quality Estimation Apparatus 10>

Figure 3:
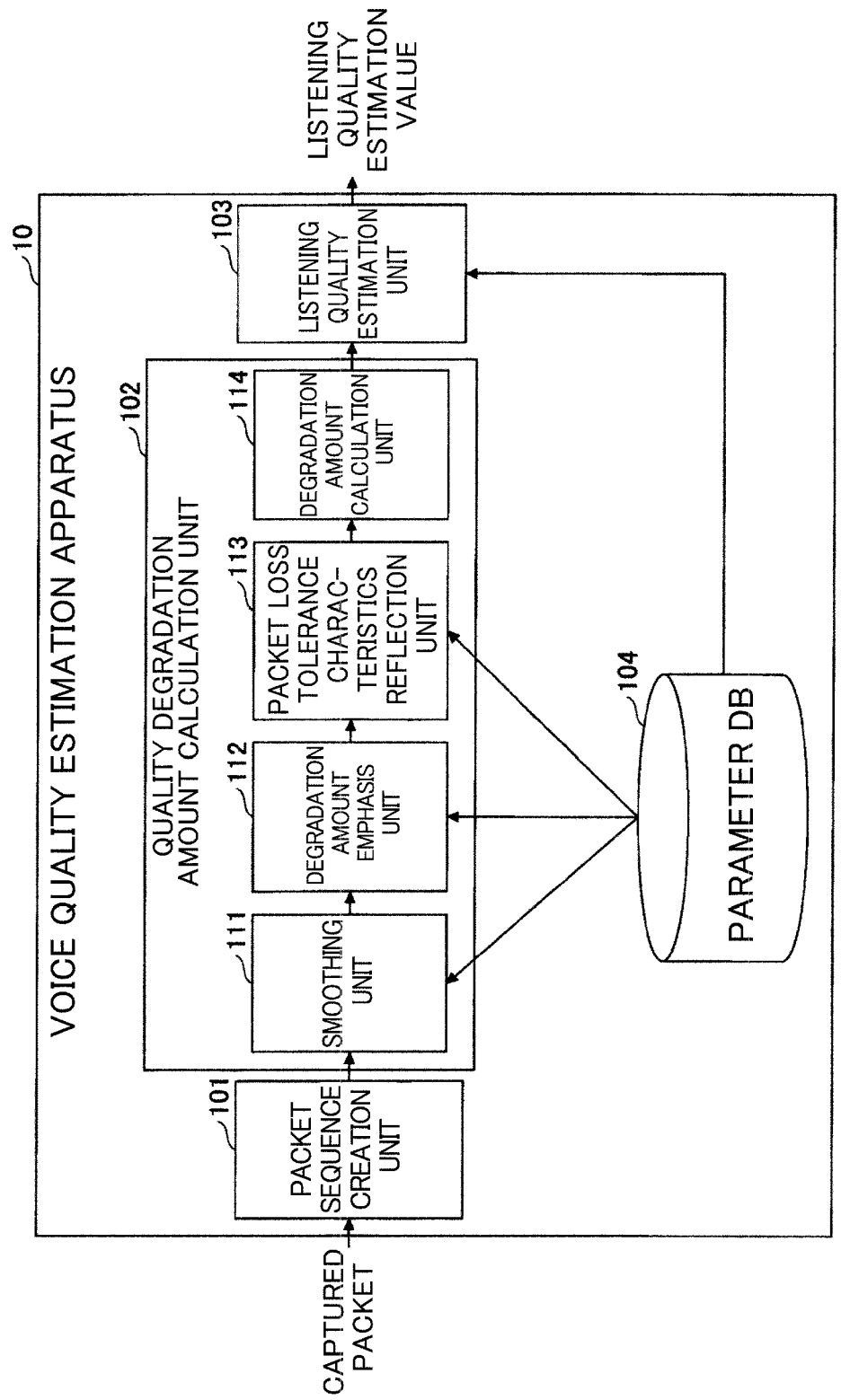
FIG. 3 is a diagram showing an example of a functional configuration of the voice quality estimation apparatus according to the first embodiment.

Next, a functional configuration of the voice quality estimation apparatus 10 according to the first embodiment will be described with reference to FIG. 3. FIG. 3 is a diagram showing an example of a functional configuration of the voice quality estimation apparatus 10 according to the first embodiment.

As shown in FIG. 3, the voice quality estimation apparatus 10 according to the first embodiment includes a packet sequence creation unit 101, a quality degradation amount calculation unit 102, and a listening quality estimation unit 103. These units are realized through processing that is performed by the processor 15 executing one or more programs installed in the voice quality estimation apparatus 10, for example.

The voice quality estimation apparatus 10 according to the first embodiment also includes a parameter DB 104. The parameter DB 104 is realized using the memory device 16, for example. The parameter DB 104 may be realized using, for example, a storage device (for example, a NAS (Network-Attached Storage), a database server, or the like) that is connected to the voice quality estimation apparatus 10 via a communication network.

The packet sequence creation unit 101 receives, as inputs, the captured packets captured in a predetermined period for which voice quality is to be estimated, determines whether the packets transmitted from the transmission terminal 30 have arrived at the reception terminal 40 or have been lost without arriving at the reception terminal 40, and creates a packet sequence that indicates the results of the determination. For example, the packet sequence creation unit 101 creates a packet sequence that is composed of elements 0 and 1, where 0 indicates that a packet has arrived at the reception terminal 40 and 1 indicates that a packet has been lost. The following formula (1) shows an example of the packet sequence in this case.

[Math. 1]

$$x(i)=0,0,0,0,0,0,0,0,0,0,1,0,1,1,0,1,0,1,0,1,0,0,0,0,0,0,0,0,0,0 \qquad (1)$$

The above formula (1) represents a packet sequence in which x(1)=0, ..., x(10)=0, x(11)=1, x(12)=0, x(13)=1, x(14)=1, x(15)=0, x(16)=1, x(17)=0, x(18)=1, x(19)=0, x(20)=1, x(21)=0, ..., and x(30)=0. That is to say, the above formula (1) represents a packet sequence that is composed of thirty elements x(1), ..., x(30) that each take 0 or 1.

For the packet sequence created by the packet sequence creation unit 101, the quality degradation amount calculation unit 102 calculates a degradation amount reflecting the above-mentioned characteristics (a) to (c). Here, the quality degradation amount calculation unit 102 includes a smoothing unit 111, a degradation amount emphasis unit 112, a packet loss tolerance characteristics reflection unit 113, and a degradation amount calculation unit 114.

The smoothing unit 111 creates $x_1(i)$ by reflecting the above characteristic (a) to each x(i). When M=2k+1, where M is the window length to be smoothed, the smoothing unit 111 creates $x_1(i)$ according to the following formula (2), and when M=2k, the smoothing unit 111 creates $x_1(i)$ according to the following formula (3).

[Math. 2]

$$x_1(i) = x(i) + \sum_{j=1}^{k} \{x(i-j) + x(i+j)\} \qquad (2)$$

[Math. 3]

$$x_1(i) = x(i) + 0.5\{x(i-k) + x(i+k)\} + \sum_{j=1}^{k-1} \{x(i-j) + x(i+j)\} \qquad (3)$$

Here, the window length M is a parameter that depends on the codec type and the PLC of the voice call, and is stored in the parameter DB 104 for each combination of the voice codec type and the PLC type.

Hereinafter, the total number of $x_1(i)$ obtained by the smoothing unit 111 is denoted as N, and the time width of the packet sequence composed of $x_1(1), \ldots, X_1(N)$ is denoted as T.

The degradation amount emphasis unit 112 creates $x_2(i)$ by reflecting the above characteristic (b) to each $x_1(i)$. The degradation amount emphasis unit 112 creates $x_2(i)$ according to the following formula (4).

[Math. 4]

$$x_2(i)=\min(x_1(i)+\alpha^{x1(i)}-1,\gamma) \qquad (4)$$

Here, α and γ are parameters that depend on the codec type and the PLC of the voice call, and are stored in the parameter DB 104 for each combination of the voice codec type and the PLC type. Note that the above formula (4) may also be referred to as a degradation emphasis function.

The packet loss tolerance characteristics reflection unit 113 creates $x_3(i)$ by reflecting the above characteristic (c) to each $x_2(i)$. The packet loss tolerance characteristics reflection unit 113 creates $x_3(i)$ according to the following formula (5).

[Math. 5]

$$x_3(i) = \max(x_2(i) - \beta, 0) \quad (5)$$

Here, $\beta$ is a parameter that depends on the codec type and the PLC of the voice call, and is stored in the parameter DB 104 for each combination of the voice codec type and the PLC type.

The degradation amount calculation unit 114 calculates the degradation amount per unit time by dividing the sum of $x_3(i)$ by a time width T of the packet sequence. That is to say, the degradation amount calculation unit 114 calculates a degradation amount y according to the following formula (6).

[Math. 6]

$$y = \frac{\sum_{i=1}^{N} x_3(i)}{T} \quad (6)$$

Note that the unit of the time width T is seconds, for example.

The listening quality estimation unit 103 calculates an estimation value (hereinafter referred to as a "listening voice quality estimation value") of listening voice quality (that is to say, voice quality that is perceived by the user), using a mapping function that indicates a relationship between the degradation amount y calculated by the degradation amount calculation unit 114 and a subjective quality evaluation value. The listening quality estimation unit 103 calculates the listening voice quality estimation value according to the following formula (7), for example.

[Math. 7]

$$ae^{\frac{b}{y+c}} \quad (7)$$

Here, a, b, and c are parameters that depend on the codec type and the PLC of the voice call, and are stored in the parameter DB 104 for each combination of the voice codec type and the PLC type.

The mapping function represented as the above formula (7) is an example, and a function other than the above formula (7) may be used as long as it is a monotonous decrease function in which the subjective quality evaluation value decreases as the degradation amount y increases.

Here, the parameters stored in the parameter DB 104 will be described with reference to FIG. 4. FIG. 4 is a diagram showing examples of parameters that are stored in the parameter DB 104.

As shown in FIG. 4, the parameter DB 104 stores, for each combination of the codec type and the PLC type, parameters M, $\alpha$, $\beta$, $\gamma$, a, b, and c corresponding to the combination. Therefore, when calculating the above formulas (2) to (6), the quality degradation amount calculation unit 102 uses the parameters M, $\alpha$, $\beta$, and $\gamma$ corresponding to the combination of the codec type and the PLC type of the voice call. Similarly, when calculating the above formula (7), the listening quality estimation unit 103 uses the parameters a, b, and c corresponding to the combination of the codec type and the PLC type of the voice call.

As described above, the parameters M, $\alpha$, $\beta$, $\gamma$, a, b, and c depend on the codec type and the PLC of the voice call.

Therefore, voice qualities in the case of various packet sequences are obtained through subjective quality evaluation experiment in advance, and the values of these parameters are determined in advance so that the error between the subjective listening quality and the estimated value thereof is minimized. Here, the subjective listening quality is the subjective quality that the user feels when listening to an audio signal, and is obtained through a subjective quality evaluation experiment as a mean opinion score (MOS) for the scores obtained through absolute category rating (ACR) on a five-point scale, as described in ITU-T P.800, for example.

Note that if there is only one combination of a codec type and a PLC type of a voice call, it is unnecessary to store them in a database. In this case, the quality degradation amount calculation unit 102 and the listening quality estimation unit 103 can use the parameters corresponding to the combination.

<Voice Quality Estimation Processing>

Figure 5:
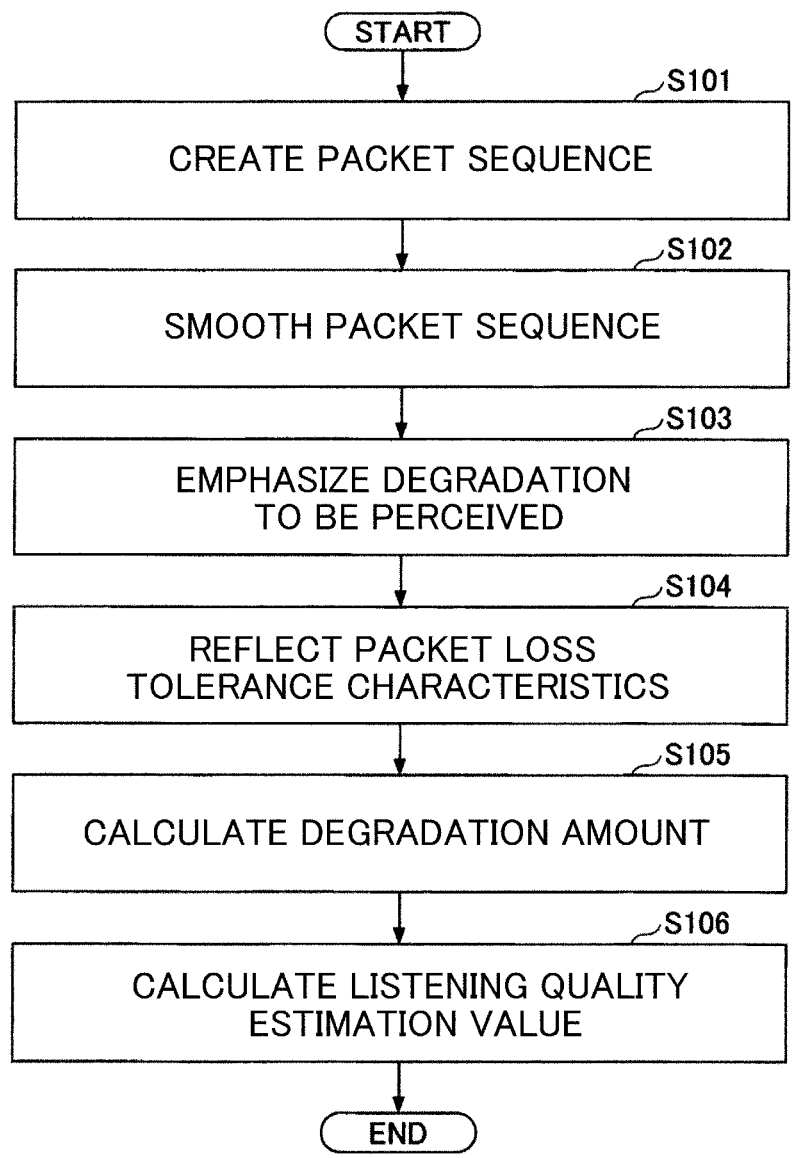
FIG. 5 is a flowchart showing an example of voice quality estimation processing according to the first embodiment.

Next, voice quality estimation processing according to the first embodiment will be described with reference to FIG. 5. FIG. 5 is a flowchart showing an example of voice quality estimation processing according to the first embodiment.

The packet sequence creation unit 101 receives, as inputs, the captured packets captured in a predetermined period for which voice quality is to be estimated, determines whether the packets transmitted from the transmission terminal 30 have arrived at the reception terminal 40 or have been lost without arriving at the reception terminal 40, and creates a packet sequence that is composed of x(i) that each indicate the results of the determination (step S101).

Next, the smoothing unit 111 of the quality degradation amount calculation unit 102 creates $x_1(i)$ from x(i) respectively, according to the above formula (2) when M=2k+1 and according to the above formula (3) when M=2k (step S102). Thus, a sequence that is composed of $x_1(i)$ reflecting the above characteristic (a) is obtained.

Next, the degradation amount emphasis unit 112 of the quality degradation amount calculation unit 102 creates $x_2(i)$ from $x_1(i)$ respectively according to the above formula (4) (step S103). Thus, a sequence that is composed of $x_2(i)$ reflecting the above characteristic (b) is obtained.

Next, the packet loss tolerance characteristics reflection unit 113 of the quality degradation amount calculation unit 102 creates $x_3(i)$ from $x_2(i)$ respectively according to the above formula (5) (step S104). Thus, a sequence that is composed of $x_3(i)$ reflecting the above characteristic (c) is obtained.

Next, the degradation amount calculation unit 114 of the quality degradation amount calculation unit 102 calculates the degradation amount y according to the above formula (6) (step S105).

Thereafter, the listening quality estimation unit 103 calculates the listening voice quality estimation value according to the above formula (7), for example (step S106). Thus, an estimation value of the voice quality experienced by the user can be obtained. Note that the listening voice quality estimation value is output to a given output destination (for example, the memory device 16, the display device 12, or another apparatus or device that is connected via a communication network), for example.

As described above, the voice quality estimation apparatus 10 according to the first embodiment can precisely estimate the voice quality experienced by the user, by reflecting the above characteristics (a) to (c) to the packet sequence. Therefore, the voice quality estimation apparatus 10 according to the first embodiment can precisely estimate the voice quality experienced by the user during a voice call service that is being provided.

Second Embodiment

Next, a second embodiment will be described. In the first embodiment, the voice quality estimation apparatus 10 receives captured packets as inputs and creates a packet sequence, whereas the second embodiment describes a case in which a packet sequence is input to the voice quality estimation apparatus 10. Thus, according to the second embodiment, it is possible to estimate the voice quality experienced by the user, using a packet sequence that has been prepared in advance or using a packet sequence that has been created through a simulation or the like, for example.

In the second embodiment, the differences from the first embodiment will be mainly described, and the descriptions of the same components as those in the first embodiment will be omitted.

<Overall Configuration of Voice Quality Estimation System 1>

Figure 6:
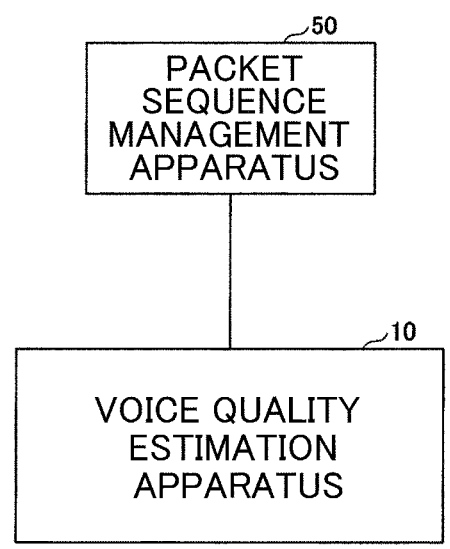
FIG. 6 is a diagram showing an example of an overall configuration of a voice quality estimation system according to a second embodiment.

The following describes an overall configuration of a voice quality estimation system 1 according to the second embodiment with reference to FIG. 6. FIG. 6 is a diagram showing an example of an overall configuration of the voice quality estimation system 1 according to the second embodiment.

As shown in FIG. 6, the voice quality estimation system 1 according to the second embodiment includes a voice quality estimation apparatus 10 and a packet sequence management apparatus 50.

The packet sequence management apparatus 50 is an apparatus that manages a packet sequence that is composed of x(i). Note that this packet sequence may be created from an actual voice call, or may be created through simulation or the like.

The voice quality estimation apparatus 10 is an apparatus that estimates the voice quality experienced by a user of a voice communication service, using a packet sequence managed by the packet sequence management apparatus 50.

<Functional Configuration of Voice Quality Estimation Apparatus 10>

Figure 7:
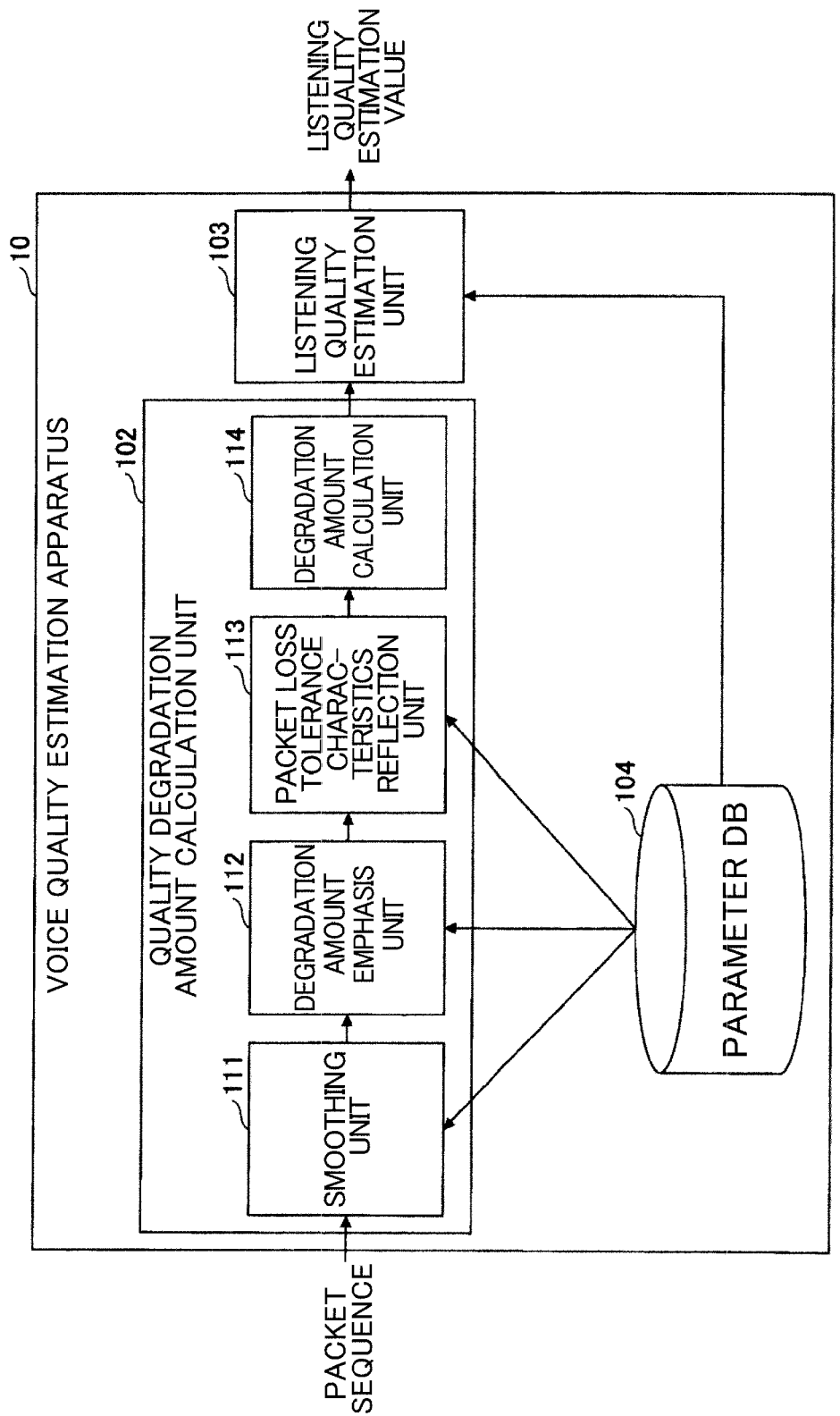
FIG. 7 is a diagram showing an example of a functional configuration of a voice quality estimation apparatus according to the second embodiment.

Next, a functional configuration of the voice quality estimation apparatus 10 according to the second embodiment will be described with reference to FIG. 7. FIG. 7 is a diagram showing an example of a functional configuration of the voice quality estimation apparatus 10 according to the second embodiment.

As shown in FIG. 7, unlike the first embodiment, the voice quality estimation apparatus 10 according to the second embodiment does not include the packet sequence creation unit 101. That is to say, the quality degradation amount calculation unit 102 of the voice quality estimation apparatus 10 according to the second embodiment receives, as an input, the packet sequence managed by the packet sequence management apparatus 50, and calculates a degradation amount for the packet sequence, reflecting the above characteristics (a) to (c).

<Voice Quality Estimation Processing>

Figure 8:
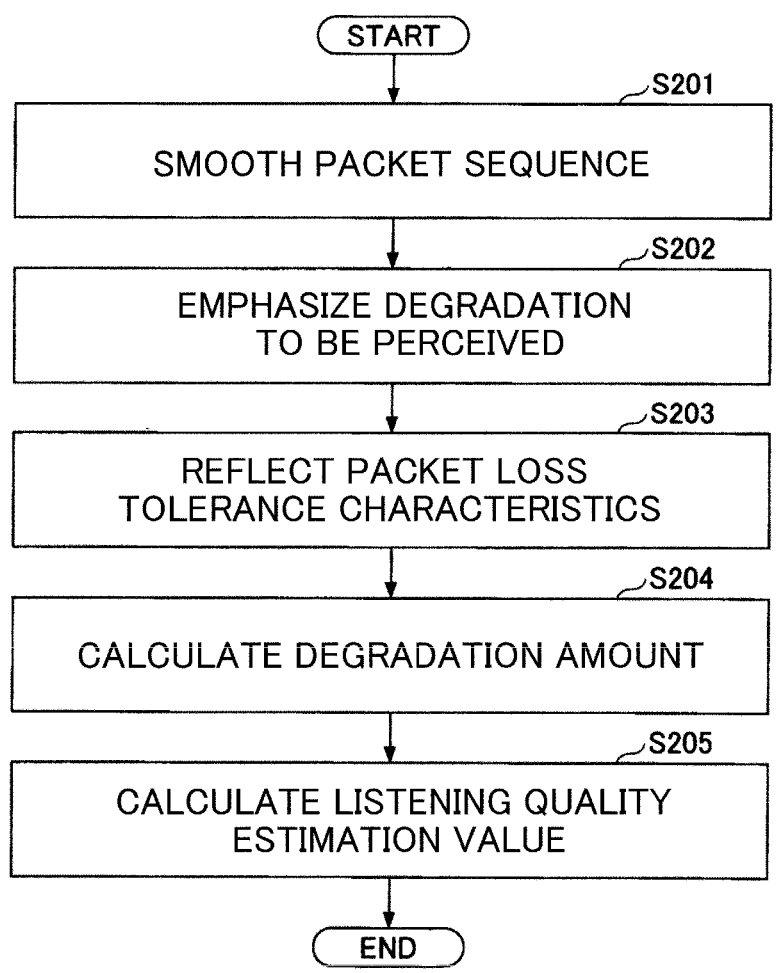
FIG. 8 is a flowchart showing an example of voice quality estimation processing according to the second embodiment.

Next, voice quality estimation processing according to the second embodiment will be described with reference to FIG. 8. FIG. 8 is a flowchart showing an example of voice quality estimation processing according to the second embodiment.

The smoothing unit 111 of the quality degradation amount calculation unit 102 receives, as an input, the packet sequence managed by the packet sequence management apparatus 50, and creates $x_1(i)$ from $x(i)$ that constitutes the packet sequence, respectively, according to the above formula (2) when M=2k+1 and according to the above formula (3) when M=2k (step S201). The subsequent steps S202 to S205 are the same as steps S103 to S106 in FIG. 5, and therefore the descriptions thereof will be omitted.

As described above, as with the first embodiment, the voice quality estimation apparatus 10 according to the second embodiment can precisely estimate the voice quality experienced by the user, by reflecting the above characteristics (a) to (c) to the packet sequence. In addition, the voice quality estimation apparatus 10 according to the second embodiment uses the packet sequence managed by the packet sequence management apparatus 50, and therefore, it is possible to precisely estimate the voice quality experienced by the user, even before a voice quality service is started, for example.

The present invention is not limited to the above-described embodiments specifically disclosed. It is possible to apply various modifications and changes thereto, and combine the invention with known techniques, for example, without departing from the disclosure in the claims.

REFERENCE SIGNS LIST

1 Voice quality estimation system
10 Voice quality estimation apparatus
11 Input device
12 Display device
13 External I/F
13a Recording medium
14 Communication I/F
15 Processor
16 Memory device
17 Bus
20 Packet capture apparatus
30 Transmission terminal
40 Reception terminal
101 Packet sequence creation unit
102 Quality degradation amount calculation unit
103 Listening quality estimation unit
104 Parameter DB
111 Smoothing unit
112 Degradation amount emphasis unit
113 Packet loss tolerance characteristics reflection unit
114 Degradation amount calculation unit
N Communication network

The invention claimed is:

1. A voice quality estimation apparatus comprising:
a packet sequence creation unit, including one or more processors, configured to create a first sequence by applying a first characteristic indicating that quality degradation caused by packet loss is perceived by a user all at once, to a sequence consisting of elements each indicating whether or not a packet of a voice call has been lost;
a smoothing unit, including one or more processors, configured to create a second sequence by applying a second characteristic indicating that a larger the quality degradation is, the more likely the user is to perceive the quality degradation, to the first sequence created by the packet sequence creation unit;
a degradation amount emphasis unit, including one or more processors, configured to create a third sequence by applying a third characteristic indicating that packet loss concealment alleviates the quality degradation to be perceived, to the second sequence created by the smoothing unit;

a packet loss tolerance characteristics reflection unit, including one or more processors, configured to create a fourth sequence from the third sequence;

a degradation amount calculation unit, including one or more processors, configured to calculate a degradation amount per unit time from the fourth sequence created by the packet loss tolerance characteristics reflection unit; and a listening quality estimation unit, including one or more processors, configured to estimate voice quality that is to be experienced by the user, from the degradation amount calculated by the calculation means, using a mapping function that indicates a relationship between the degradation amount regarding the voice quality and a voice quality evaluation value that is based on a user's subjectivity.

2. The voice quality estimation apparatus according to claim 1, wherein the smoothing unit is configured to create the second sequence by smoothing the first sequence, using, as a window length, a parameter M that has been determined in advance according to a combination of a codec type and a type of the packet loss concealment, of the voice call.

3. The voice quality estimation apparatus according to claim 2, wherein the degradation amount emphasis unit is configured to create the third sequence from the second sequence, using a degradation emphasis function to which parameters $\alpha$ and $\gamma$ are set, the parameters $\alpha$ and $\gamma$ having been determined in advance according to the combination of the codec type and the type of the packet loss concealment, of the voice call.

4. The voice quality estimation apparatus according to claim 3, wherein the packet loss tolerance characteristics reflection unit is configured to create the fourth sequence from the third sequence, using a parameter $\beta$ that has been determined in advance according to the combination of the codec type and the type of the packet loss concealment, of the voice call, based on a magnitude relationship between values obtained by subtracting the parameter $\beta$ from each of the elements constituting the third sequence, and 0.

5. The voice quality estimation apparatus according to claim 4, wherein the degradation amount calculation unit is configured to calculate the degradation amount by dividing a sum of the elements constituting the fourth sequence, by a time width of the fourth sequence.

6. The voice quality estimation apparatus according to claim 5, wherein the voice quality estimation apparatus is configured to estimate the voice quality to be experienced by the user, from the degradation amount calculated by the calculation means, using the mapping function to which parameters a, b, and c are set, the parameters a, b, and c having been determined in advance according to the combination of the codec type and the type of the packet loss concealment, of the voice call.

7. A voice quality estimation method for a computer comprising:

creating a first sequence by applying a first characteristic indicating that quality degradation caused by packet loss is perceived by a user all at once, to a sequence consisting of elements each indicating whether or not a packet of a voice call has been lost;

creating a second sequence by applying a second characteristic indicating that a larger the quality degradation is, the more likely the user is to perceive the quality degradation, to the first sequence;

creating a third sequence by applying a third characteristic indicating that packet loss concealment alleviates the quality degradation to be perceived, to the second sequence;

creating a fourth sequence from the third sequence;

calculating a degradation amount per unit time from the fourth sequence; and estimating voice quality that is to be experienced by the user, from the degradation amount, using a mapping function that indicates a relationship between the degradation amount regarding the voice quality and a voice quality evaluation value that is based on a user's subjectivity.

8. The voice quality estimation method according to claim 7, further comprising:

creating the second sequence by smoothing the first sequence, using, as a window length, a parameter M that has been determined in advance according to a combination of a codec type and a type of the packet loss concealment, of the voice call.

9. The voice quality estimation method according to claim 8, further comprising:

creating the third sequence from the second sequence, using a degradation emphasis function to which parameters $\alpha$ and $\gamma$ are set, the parameters $\alpha$ and $\gamma$ having been determined in advance according to the combination of the codec type and the type of the packet loss concealment, of the voice call.

10. The voice quality estimation method according to claim 9, further comprising:

creating the fourth sequence from the third sequence, using a parameter $\beta$ that has been determined in advance according to the combination of the codec type and the type of the packet loss concealment, of the voice call, based on a magnitude relationship between values obtained by subtracting the parameter $\beta$ from each of the elements constituting the third sequence, and 0.

11. The voice quality estimation method according to claim 10, further comprising:

calculating the degradation amount by dividing a sum of the elements constituting the fourth sequence, by a time width of the fourth sequence.

12. The voice quality estimation method according to claim 11, further comprising:

estimating the voice quality to be experienced by the user, from the degradation amount calculated by the calculation means, using the mapping function to which parameters a, b, and c are set, the parameters a, b, and c having been determined in advance according to the combination of the codec type and the type of the packet loss concealment, of the voice call.

13. A non-transitory computer-readable medium storing software comprising instructions executable by one or more computers which, upon such execution, cause the one or more computers to perform operations comprising:

creating a first sequence by applying a first characteristic indicating that quality degradation caused by packet loss is perceived by a user all at once, to a sequence consisting of elements each indicating whether or not a packet of a voice call has been lost;

creating a second sequence by applying a second characteristic indicating that a larger the quality degradation is, the more likely the user is to perceive the quality degradation, to the first sequence;

creating a third sequence by applying a third characteristic indicating that packet loss concealment alleviates the quality degradation to be perceived, to the second sequence;

creating a fourth sequence from the third sequence;

calculating a degradation amount per unit time from the fourth sequence; and estimating voice quality that is to be experienced by the user, from the degradation amount, using a mapping function that indicates a relationship between the degradation amount regarding the voice quality and a voice quality evaluation value that is based on a user's subjectivity.

14. The non-transitory computer-readable medium according to claim 13, further comprising:

creating the second sequence by smoothing the first sequence, using, as a window length a parameter M that has been determined in advance according to a combination of a codec type and a type of the packet loss concealment, of the voice call.

15. The non-transitory computer-readable medium according to claim 14, further comprising:

creating the third sequence from the second sequence, using a degradation emphasis function to which parameters $\alpha$ and $\gamma$ are set, the parameters $\alpha$ and $\gamma$ having been determined in advance according to the combination of the codec type and the type of the packet loss concealment, of the voice call.

16. The non-transitory computer-readable medium according to claim 15, further comprising:

creating the fourth sequence from the third sequence, using a parameter $\beta$ that has been determined in advance according to the combination of the codec type and the type of the packet loss concealment, of the voice call, based on a magnitude relationship between values obtained by subtracting the parameter $\beta$ from each of the elements constituting the third sequence, and 0.

17. The non-transitory computer-readable medium according to claim 16, further comprising:

calculating the degradation amount by dividing a sum of the elements constituting the fourth sequence, by a time width of the fourth sequence.

18. The non-transitory computer-readable medium according to claim 17, further comprising:

estimating the voice quality to be experienced by the user, from the degradation amount calculated by the calculation means, using the mapping function to which parameters a, b, and c are set, the parameters a, b, and c having been determined in advance according to the combination of the codec type and the type of the packet loss concealment, of the voice call.

* * * * *